United States Patent [19]

Miller

[11] 4,361,477
[45] Nov. 30, 1982

[54] STABILIZING AND DEWAXING LUBE OILS
[75] Inventor: Stephen J. Miller, San Francisco, Calif.
[73] Assignee: Chevron Research Company, San Francisco, Calif.
[21] Appl. No.: 255,015
[22] Filed: Apr. 17, 1981
[51] Int. Cl.³ .................... C10G 11/05; C10G 55/06
[52] U.S. Cl. ...................................... 208/67; 208/18; 208/58; 208/71
[58] Field of Search ................... 208/18, 72, 46, 58, 208/67, 71, 98

[56] References Cited
U.S. PATENT DOCUMENTS

| | | | |
|---|---|---|---|
| 3,853,749 | 12/1974 | Espenscheid et al. | 208/307 |
| 3,928,171 | 12/1975 | Yan et al. | 208/46 |
| 4,181,597 | 1/1980 | Yan et al. | 208/46 |
| 4,309,275 | 1/1982 | Mulaskey | 208/109 |
| 4,309,276 | 1/1982 | Miller | 208/109 |

FOREIGN PATENT DOCUMENTS 2367815  5/1978  France ................................. 208/71

Primary Examiner—Delbert E. Gantz
Assistant Examiner—G. E. Schmitkons
Attorney, Agent, or Firm—D. A. Newell; S. R. La Paglia; W. L. Stumpf

[57] ABSTRACT

A two-step process for dewaxing and stabilizing hydrocracked lubricating oil stocks is disclosed. High-silica zeolite produces catalytic dewaxer effluent containing lower olefins for favorable stabilizing (alkylation) reactions by contact with acidic catalyst substantially free of hydrogenation activity.

7 Claims, No Drawings

STABILIZING AND DEWAXING LUBE OILS

TECHNICAL FIELD

High quality lubricating oils are critical for the machinery of modern society. Unfortunately, the supply of natural crude oils having good lubricating properties, e.g., Pennsylvania and Arabian light feedstocks is not enough to meet the demand. Additionally, because of uncertainties in world crude oil supplies, it is necessary to be able to produce high quality lubricating oils efficiently from ordinary crude feedstocks.

Numerous processes have been proposed to produce lubricating oils from the ordinary and low quality stocks which normally would be converted into other products. Many of these processes use hydrocracking steps. The problem is that hydrocracked lube oil stocks tend to be unstable in the presence of oxygen and light.

Many of the proposed process schemes involve the use of catalytic dewaxing to lower the pour point of the lube oil stock. Catalytic dewaxing tends to be more efficient than solvent dewaxing since it selectively removes undesirable components from the feed. However, while the product of the extraction step of a solvent dewaxing process tends to be stable to oxygen and to ultraviolet radiation, the product of catalytically dewaxing a hydrocracked feedstock tends to be difficult to stabilize.

In order to achieve the necessary oxidative stability, the typical hydrocracked lube oils stock is subject to mild hydrogenation processes. The goal of these processes is to hydrogenate the unstable species, which are thought to be partially saturated polycyclic compounds, while minimizing further cracking and loss of the lube stock. While hydrogenative processes tend to be effective in stabilizing the lube stock to oxidation, it is difficult to avoid some loss of the lube stock by cracking. Additionally, the catalysts used usually contain metallic hydrogenation components such as Group VI and Group VIII metals. A disadvantage to these processes is that hydrogen is consumed. Especially in the petroleum refinery, it is preferable to use hydrogen in processes which produce a significant increase in the value of the product over the reactant, for example, in hydrocracking heavy gas oils, as opposed to stabilizing lube stocks.

A number of issued U.S. patents disclose the effect of adding hydrocarbons to various catalytic processes. For example, U.S. Pat. No. 3,214,366, Brennen et al., Oct. 26, 1965, states that hydrocracking can be improved by carrying out the conversion in the presence of $C_3$ to $C_8$ olefins. More recently, U.S. Pat. No. 4,146,465, Blazek et al., Mar. 27, 1979, discloses a process for increasing the octane rating of gasoline and decreasing the quantity of coke produced during catalytic cracking with rare earth faujasites by adding $C_2$ to $C_6$ linear olefins to the feed. Recently issued U.S. Pat. No. 4,206,037, Bousquet et al., June 3, 1980, discloses catalytic hydrodewaxing in the presence of added isobutane using hydrogen and metal substituted zeolites; including ZSM-5. These background patents do not relate particularly to the problem of stabilizing hydrocracked lube oil stocks to oxidation.

Several additional issued patents relate to stabilizing hydrocracked lube stocks by adding stabilizing agents such as olefins, alcohols, esters or alkylhalides to the lube stock while in the presence of a heterogeneous acidic catalyst such as acid resins, clays, and aluminosilicates having controlled alkylation activity, e.g., U.S. Pat. No. 3,928,171, Yan et al., Dec. 23, 1975 and U.S. Pat. No. 4,181,597, Yan et al., Jan. 1, 1980. French Pat. No. 2,367,815, Yan, May 12, 1978, discloses a process for stabilizing hydrocracked lube oils which have been dewaxed, preferably solvent dewaxed, by contacting them with olefins, preferably $C_6$ to $C_{10}$. The stabilizing catalyst is a heterogeneous acidic catalyst; the olefins which are not consumed in the reaction are distilled off from the product and combined with other olefins to be added into the stabilizing reaction zone feed. The processes disclosed in these patents, however, have the undesirable requirement that external sources of stabilizing agents, typically the olefin, must be used.

U.S. Pat. No. 3,853,749, Espenscheid et al., Dec. 10, 1974, discloses a process for stabilizing hydrocracked lube oils by contacting a lube oil which contains from 1 to 10% paraffins with a ZSM-5 catalyst. The paraffins may be those present in the undewaxed hydrocracked feed or may be added; the silica-to-alumina ratio is disclosed as ranging from 15 to 200 to 1.

A number of U.S. patents disclose dewaxing with intermediate pore size zeolites, but not stabilizing the dewaxed feeds. Additionally, many of these references relate to dewaxing solvent refined lube stocks rather than hydrocracked lube stocks. Among these issued patents are U.S. Pat. Nos. Re. 28,398 of 3,700,585, Chen, Oct. 24, 1972; Re. 29,857 of 3,790,471, Argauer et al., Feb. 5, 1974. Re. 29,948 of 3,941,871, Dwyer et al., Mar. 2, 1976, discloses hydrocarbon conversion reactions with an organosilicate having a ZSM-5 type X-ray diffraction pattern; U.S. Pat. No. 4,061,724, Grose et al., Dec. 6, 1977, discloses a low aluminum crystalline silica polymorph, called "silicalite," which is useful as an adsorbent.

In spite of the large amount of research into developing lubricating oil stocks and stabilizing them, there continues to be intensive research into developing more efficient and more convenient methods for achieving those goals. The object of the present invention is to provide such a convenient and efficient process.

I have discovered that hydrocracked lube oil stocks can be dewaxed and stabilized to air and photolytic oxidation without the addition of extraneous chemicals. I have discovered a dewaxing and stabilizing process which is effective in the presence and in the absence of diluent gases such as hydrogen and nitrogen. The process produces lube stocks of increased stability from lighter and heavier feeds while eliminating the unselective cracking which occurs in hydrogenation types of stabilizing reactions. Additionally, the dewaxing and stabilizing process is effective at both high and low pressures thereby increasing refinery efficiency and flexibility. Further, the process can produce a lube oil product of low color content.

These advantages are achieved through my discovery that dewaxing the hydrocracked lube stock with a low aluminum content intermediate pore size zeolite substantially free of hydrogen transfer activity, followed by contacting the dewaxed olefin containing effluent with an acidic alkylation catalyst produces a low pour point, high stability, low color, lube stock in good yields.

TECHNICAL DISCLOSURE

The discovery of the present invention is embodied in a lubricating oil dewaxing and stabilizing process, comprising:

(a) catalytically dewaxing a hydrocracked hydrocarbonaceous feedstock by contacting said feedstock with a catalyst which comprises an intermediate pore size zeolite, said zeolite having a silica-to-alumina mole ratio of greater than about 200:1 and being in the hydrogen form, to produce a dewaxed effluent which contains olefins; and (b) stabilizing at least part of said dewaxed effluent by contacting said part with a heterogeneous acidic catalyst which is substantially free of hydrogenation activity.

The hydrocarbonaceous feeds from which lube oils are made usually contain aromatic compounds as well as normal and branched paraffins of very long chain lengths. These feeds usually boil in the gas oil range. Preferred feedstocks are vacuum gas oils with normal boiling ranges above about 350° C. and below about 600° C., and deasphalted residual oils having normal boiling ranges above about 480° C. and below about 650° C. Reduced topped crude oils, shale oils, liquified coal, coke distillates, flask or thermally cracked oils, atmospheric residua, and other heavy oils can also be used as the feed source. The process is particularly effective in stabilizing lube oils prepared from the heavier feedstocks, e.g., medium neutral (200 S.U.S. at 38° C.) as well as being effective in stabilizing lighter feedstocks, e.g., light neutral (100 S.U.S.).

The hydrocarbonaceous feed is hydrocracked using standard reaction conditions and catalysts. Hydrocracking can take place in one or more reaction zones and with or without initial denitrogenation or desulfurization steps.

Typical hydrocracking process conditions include temperatures in the range of 250° C. to 500° C., pressures in the range of 30 to 205 bar, or more, a hydrogen recycle rate of 100 to 1100 SCM/KL, and an LHSV (v/v/hr) of 0.1 to 50.

Catalysts employed in the hydrocracking zone or zones include those having hydrogenation-dehydrogenation activity, and active cracking supports. The support is often a refractory inorganic oxide such as silica-alumina, silica-alumina-zirconia and silica-alumina-titania composites, acid-treated clays, crystalline aluminosilicate zeolitic molecular sieves (such as Zeolite A, faujasite, Zeolite X and Zeolite Y), and combinations of the above.

Hydrogenation-dehydrogenation components of the hydrocracking catalyst usually comprise metals selected from Group VIII and Group VI-B of the Periodic Table, and compounds including them. Preferred Group VIII components include cobalt and nickel and their oxides and sulfides. Preferred Group VI-B components are the oxides and sulfides of molybdenum and tungsten. Thus, examples of hydrocracking catalysts which are preferred for use in the hydrocracking step are the combinations nickel-tungsten-silica-alumina and nickel-molybdenum-silica-alumina.

A particularly preferred hydrocracking catalyst for use in the present process is nickel sulfide/tungsten sulfide on a silica-alumina base which contains discrete metal phosphate particles (described in U.S. Pat. No. 3,493,517, incorporated herein by reference).

The catalytic dewaxing step of the present invention uses intermediate pore size zeolites having a silica-to-alumina mole ratio greater than about 200:1 and standard reaction conditions. The intermediate pore size zeolites used in the dewaxing step are zeolites having a silica-to-alumina mole ratio preferably greater than about 500:1 and more preferably greater than about 1000:1. In spite of their low aluminum content, these zeolites not only have useful dewaxing activity, but also produce significant amounts of olefins even in the presence of hydrogen and at high pressures.

By "intermediate pore size" as used herein is meant an effective pore aperture in the range of about 5 to 6.5 Angstroms when the zeolite is in the H-form. Zeolites having pore apertures in this range tend to have unique molecular sieving characteristics. Unlike small pore zeolites such as erionite, they will allow hydrocarbons having some branching into the zeolitic void spaces. Unlike large pore zeolites such as the faujasites, they can differentiate between n-alkanes and slightly branched alkanes on the one hand and larger branched alkanes having, for example, quaternary carbon atoms.

The effective pore size of the zeolites can be measured using standard adsorption techniques and hydrocarbonaceous compounds of known minimum kinetic diameters. See Breck, *Zeolite Molecular Sieves*, 1974 (especially Chapter 8) and Anderson et al., J. Catalysis 58, 114 (1979), both of which are incorporated by reference.

Intermediate pore size zeolites in the H-form will typically admit molecules having kinetic diameters of 5.0 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular zeolite, but do not penetrate as quickly and in some cases are effectively excluded (for example, 2,2-dimethylbutane is excluded from H-ZSM-5). Compounds having kinetic diameters in the range of 6 to 6.5 Angstroms include: cyclohexane (6.0), 2,3-dimethylbutane (6.1), 2,2-dimethylbutane (6.2), m-xylene (6.1), and 1,2,3,4-tetramethylbenzene (6.4). Generally, compounds having kinetic diameters of greater than about 6.5 Angstroms do not penetrate the pore apertures and thus are not absorbed into the interior of the zeolite. Examples of such larger compounds include: o-xylene (6.8), hexamethylbenzene (7.1), 1,3,5-trimethylbenzene (7.5), and tributylamine (8.1).

The preferred effective pore size range is from about 5.3 to about 6.2 Angstroms. ZSM-5 and silicalite, for example, fall within this range.

In performing adsorption measurements to determine pore size, standard techniques are used. It is convenient to consider a particular molecule as excluded if it does not reach at least 95% of its equilibrium adsorption value on the zeolite in less than about 10 minutes (p/po=0.5; 25° C.).

Examples of intermediate pore size zeolites include, silicalite, and members of the ZSM series such as ZSM-5, ZSM-11, ZSM-12, ZSM-21, ZSM-23, ZSM-35, and ZSM-38.

Silicalite is described in U.S. Pat. No. 4,061,724; crystalline organosilicates are described in U.S. Pat. No. Re. 29,948 of U.S. Pat. No. 3,941,871, Dwyer et al., Mar. 2, 1976; ZSM-5 is described in U.S. Pat. Nos. 3,702,886 and 3,770,614; ZSM-11 is described in U.S. Pat. No.

3,709,979; ZSM-12 is described in U.S. Pat. No. 3,832,449; ZSM-21 and ZSM-38 are described in U.S. Pat. No. 3,948,758; ZSM-23 is described in U.S. Pat. No. 4,076,842; and ZSM-35 is described in U.S. Pat. No. 4,016,245. These patents are incorporated herein by reference. The preferred zeolites are low alumina ZSM-5 and silicalite.

The zeolitic catalyst must be substantially free of hydrogen transfer activity such as is conferred by metal hydrogenation components, and high aluminum contents (low silica:alumina mole ratios). If hydrogenation components are present or the silica:alumina ratio is low, the olefins which would otherwise be present in the dewaxed effluent are saturated. Chemicals from outside the process stream then have to be added before the stabilizing reaction takes place. The hydrogen transfer activity of the low alumina zeolites can be further lowered by standard processes such as steaming.

Typical dewaxing conditions include an LHSV (v/v/hr) of 0.5 to 200, a temperature from about 260° C. to 610° C. and a pressure from below atmospheric to several hundred bar. Where the feed to the dewaxing step has a wide boiling range, it is especially preferred to separate it into at least two fractions, where each fraction has a boiling range of greater than about 50° C. When a wide boiling range feed is catalytically dewaxed, the higher boiling portions tend to be underdewaxed while the lower boiling portions tend to be overdewaxed. By splitting the feed to the dewaxing step, the different boiling range fractions can be dewaxed at different severities. After dewaxing, the separate streams can be recombined or processed separately.

As noted above, the dewaxing step can take place at high or low pressures and the feedstock can contain diluent gases. This flexibility in pressure and gas content allows more efficient refinery operation in that the feedstock which has been hydrocracked, usually at pressures above 135 bar, can be dewaxed at the same pressure. Additionally, the dewaxed effluent can also be stabilized at the same pressure. Further, if it is desirable, the unreacted hydrogen in the hydrocracked feedstock need not be removed before performing the dewaxing and stabilization steps since the low alumina intermediate pore size zeolites produce olefins even in the presence of hydrogen. If it is desirable to operate the dewaxing step at low pressures and after hydrogen is removed from the hydrocracked feedstock, pressure step up apparatus for the stabilizing step is unnecesary as the olefins produced by the zeolite react with the dewaxed effluent over the heterogeneous acidic catalyst at both high and low pressures to stabilize the product.

The preferred method of operation is to operate the dewaxing and stabilizing steps at atmospheric pressures, or less than 35 bar (gauge), and in the absence of hydrogen or other diluent gases. If hydrogen or other diluent gases are not to be removed from the hydrocracked feedstock, high pressure operation, greater than 35 bar (gauge), is preferred. Low pressure operation in the absence of hydrogen gives superior stability, but catalyst fouling tends to be more rapid than at high hydrogen pressures. High pressure operation with hydrogen tends to have longer run lives (lower fouling) but somewhat lower stability than low pressure operation. The person of skill in the art will, of course, balance these considerations to achieve optimal performance for the particular feed, product and facility.

The heterogeneous catalyst used in the stabilizing step is an acidic, or acid-acting catalyst. The classes of suitable catalysts include acid resins, clays, aluminosilicates, such as zeolites, and other acidic oxides. These solid catalysts which are useful in fluid and fixed bed catalysis, being heterogeneous to the reactants, are readily separable therefrom.

Of particular interest are the resins, clays and zeolites. The resins, preferably cation exchange resins, consist of a polymeric resin matrix having acidic functional group, such as sulfonic, phosphonic, phenyl sulfonic, phenylphosphonic, phenolsulfonic, and the like. The matrix may be any resin; the resin preferably is porous, or becomes porous during the process. Resins include phenolic resins, polystyrene, copolymers of styrene with polyfunctional polymerizable monomers or partial polymers, such as styrene-divinyl aryls, e.g., divinyl benzene, or acrylates, polyacrylic or polymethacrylic acid resins, and the halogenated variations of these above said resins. Sulfonated coal also provides an acid acting catalyst. Acidic clays, such as attapulgite and montmorillonite are among the preferred catalysts. Crystalline aluminosilicates, at least partially in the hydrogen form, are also very good catalysts. They generally have the formula:

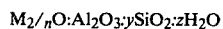

$$M_{2/n}O:Al_2O_3:ySiO_2:zH_2O$$

where M is a cation, n is its valence, y is the moles of silica, and z is the moles of water. Crystalline zeolites are well-known. Modified zeolites, such as rare-earth-exchanged or other metal exchanged zeolites may be used. Rare-earth-exchanged Y-types (y is over 3) and X-types (y is under 3) are examples of these. Both natural aluminosilicates, such as levynite, faujasite, analcite, noselite, phillipsite, datolite, chabazite, leucite, mordenite, and the like, and synthetic aluminosilicates are examples of satisfactory catalysts. Other catalysts which may be used in this invention include inorganic oxides such as alumina, silica-alumina, thoria, vanadia, zirconia, titania, chromia, chromia-alumina, molybdena, germania, ceria, halogenated alumina, molybdena-alumina and mixtures thereof and these with any of the other foregoing classes of catalysts.

Those skilled in the art of heterogeneous catalysis recognize that there are many insoluble solids with a porous structure that are effective in inducing acid-catalyzed reactions, and that, because of this property, are referred to as "acidic." It is also recognized that these heterogeneous, acidic catalysts vary in efficacy, depending on catalyst preparations in some cases, and on other factors such as the particular reactions involved. These heterogeneous acidic catalysts may be organic, such as sulfonated polystyrene, or inorganic, such as silica-alumina cracking catalyst. The inorganic acidic catalysts exemplified in the foregoing paragraphs and elsewhere are simple or mixed inorganic oxides, which may be polymeric or hydrated to varying extents, as will be recognized by one skilled in the art. With few exceptions, the heterogeneous inorganic acidic oxide catalysts useful in this invention comprise an oxide selected from the group consisting of silicon and aluminum. Included in this group are the acidic clays, the acidic forms of crystalline aluminosilicate zeolites, and the known acidic cracking catalysts based on mixed oxides such as silica-alumina, silica-magnesia and silica-zirconia.

The dewaxed effluent, or at least part of it, is mixed with the catalyst, typically in a continuous operation for example, in a fixed bed reactor which contains the catalyst. Catalyst contact may be carried out at between about 20° C. to 400° C., preferably from 25° C. and 350° C., and most preferably from 90° C. to 280° C. The stabilizing step may be carried out batchwise or continuously at a temperature of about 20° C. to about 400° C., an LHSV of about 0.1 to about 10 (when carried out continuously) and any convenient pressure. The preferred ranges for the above conditions are temperature of 25° C. to about 350° C., an LHSV of 0.5 to 2, and pressure of from about 1 to about 35 bar (gauge).

The color test referred to herein is ASTM D-1500 which incorporates a scale of 0.5 to 8.0 in 0.5 increments, with a low color number indicating high transmittance. "Good color" as used herein means an ASTM D-1500 color number of 2.0 or less.

By "good ultraviolet stability" as used herein is meant that at least about 4 hours will pass in the test described below before an unsatisfactory level of floc appears. Preferably, at least 6 hours will pass. An unsatisfactory level of floc is moderate floc of the level found in mid-continent solvent refined 100 neutral oil after about 11 hours in the ultraviolet stability test.

The ultraviolet stability of the lube oil is measured by placing the oil samples in glass bottles 16 mm in diameter, 50 mm high and having a wall thickness of about 1 mm. The caps are loosened and the bottles are placed in a circular rack surrounding a 450-watt cylindrical Hanovia Mercury vapor lamp (product of Conrad Precision Industries, Inc.) mounted in a vertical position. The distance along a line perpendicular to the longitudinal axis of the lamp extending from the longitudinal axis of the lamp to the longitudinal axis of the bottle is 2½ inches. The sample is observed over a period of time. At the first appearance of a light fine floc (small particles suspended in the oil), the time to formation of the floc is noted. The additional time until a moderate floc or heavy floc is also noted. In some cases of poor stability, a ring of precipitated particles can be observed during the test clinging to the walls of the bottle. Typically, the test is terminated at 20 hours if no floc appears; a product producing such a UV life has superior stability.

The feeds used in the Examples had the following characteristics.

| Feed A | |
|---|---|
| Gravity, °API | 32.5 |
| S, ppm | 4 |
| N, ppm | 1.6 |
| Pour point | 18° C. |
| Vol. % | |
| paraffins | 34.5 |
| naphthenes | 48.7 |
| aromatics | 16.4 |
| Nominal boiling range | 371–427° C. |
| Distillation (D 1160, °C.) | |
| 5/10 | 367/372 |
| 30/50 | 380/389 |
| 70/90 | 398/413 |
| 95/EP | 420/433 |
| Feed B | |
| Gravity, °API | 29.6 |
| S, ppm | 24 |
| N, ppm | 6 |
| Pour point | 38° C. |
| Nominal boiling range | 427–482° C. |
| Distillation (D 1160, °C.) | |
| 5/10 | 432/436 |
| 30/50 | 446/455 |
| 70/90 | 464/479 |
| 95/EP | 486/496 |
| Feed C | |
| Gravity, °API | 30.3 |
| S, ppm | 17 |
| N, ppm | 4 |
| Pour point | 52° C. |
| Nominal boiling range | 482° C.+ |
| Distillation (D 1160, °C.) | |
| 5/10 | 485/489 |
| 30/50 | 497/506 |
| 70/90 | 519/541 |
| 95/EP | 551/553 |
| Feed D | |
| Gravity, °API | 34.2 |
| S, ppm | 15 |
| N, ppm | 1.3 |
| Pour point | 27° C. |
| Nominal boiling range | 371° C.+ fractionator bottoms |
| Distillation (D 1160, °C.) | |
| 5/10 | 386/387 |
| 30/50 | 391/394 |
| 70/90 | 400/415 |
| 95/EP | 428/451 |
| Vol. % | |
| paraffins | 40.5 |
| naphthenes | 48.6 |
| aromatics | 10.7 |

EXAMPLE 1

An experiment was performed using Feed A and a first reaction zone containing a silicalite/Catapal alumina (65%/35% W/W) catalyst (LHSV=2) and a second reaction zone containing a commercial montmorillonite clay (KSF produced by United Catalysts, Inc.; LHSV=1). The temperature was controlled to dewax the feed to a pour point of about −34° C.

TABLE 1

| Time of Run (Hr) | Pressure (bar, gauge) | KSF Temperature (°C.) | $H_2$ Rate (MSCF/bbl) | UV Life |
|---|---|---|---|---|
| 90 | 41.5 | 232 | 12 | 7 |
| 130 | 41.5 | 232 | 12 | 6 |
| 200 | 41.5 | 232 | 12 | 5 |
| 250 | 41.5 | 232 | 12 | 5 |
| 300 | 69 | 232 | 12 | 6 |
| 425 | 69 | 232 | 12 | 6 |
| 480 | 69 | 232 | 12 | 6 |
| 525 | 69 | 93 | 12 | 4 |
| 575 | 69 | 93 | 12 | 4 |
| 700 | 69 | 260 | 12 | 6 |
| 860 | 69 | 260 | 12 | 6 |
| 980 | 69 | 260 | 12 | 6 |
| 1055 | 69 | 260 | 12 | 6 |
| 1200 | 0 | 260 | 0 | 20+ |
| 1255 | 0 | 260 | 0 | 20+ |
| 1350 | 0 | 260 | 0 | 20+ |
| 1405 | 0 | 260 | 0 | 20+ |

EXAMPLE 2

An experiment was performed to investigate the effect of operating the dewaxing and stabilizing process at high pressure and in the presence of hydrogen. Feed A was catalytically dewaxed and stabilized using an H-silicalite material (bound with Catapal alumina, 65/35) in one reaction zone (LHSV of 2) and a commercial montmorillonite clay (KSF manufactured by United Catalysts, Inc.) in the second reaction zone (LHSV of 1). The feed was dewaxed to a pour point of −29° C. at 69 bar (gauge) with a hydrogen feed rate of 12 MSCF/bbl, hydrogen consumption of ca. 100 SCF/bbl, and a temperature of 321° C. to 327° C. in the first zone and 232° C. to 260° C. in the second zone. The dewaxed product had a UV life of 6 hours and was produced in a yield of 85 wt. %.

This illustrates the ability of the claimed process to stabilize lube oils even when high pressure is used and hydrogen is present. Further, little hydrogen was consumed in the process.

EXAMPLE 3

An experiment was performed to compare the two-step dewaxing and stabilizing process with a one-step treatment on medium neutral Feed B. The feed was dewaxed to a pour point of −9° C. in the absence of hydrogen and at 0 bar (gauge). The two-step process used a silicalite/Catapal (65/35) catalyst (LHSV=2) and KSF montmorillonite clay (United Catalysts, Inc.; LHSV=1); the one-step treatment used a silicalite material (LHSV=2). Both silicalite materials had the same silica:alumina mole ratio, 236:1. The product yield from both processes was 89 wt. % even though there was an additional stabilization step; cracking during stabilizing is negligible. While the UV life for the one-step product was 8 hours, that for the two-step product was 18 hours.

EXAMPLE 4

An experiment was performed using heavy neutral Feed C using a silicalite/Catapal catalyst (65/35) (LHSV=2), KSF (United Catalysts, Inc.; LHSV=1) system, no hydrogen and 0 bar (gauge). The oil was dewaxed to a pour point of −7° C. at a yield of 79 wt. %. The UV life was 9 hours.

EXAMPLE 5

A series of experiments was performed to compare the effect of different dewaxing/stabilizing catalyst combinations on the UV life of Feed D. In Table 2, Sil—is a silicalite material of silica:alumina ratio 236:1 steamed 24 hours at 760° C.; SMM—is a montmorillonite produced by Baroid Corp.; KSF—is a montmorillonite produced by United Catalysts, Inc.; HZSM-5—is a HZSM-5 material of silica:alumina ratio 70:1. The hydrogen rate is 12 MSCF/bbl.

TABLE 2

| Catalyst | Sil | Sil/Sil | Sil/SMM | Sil/SMM | Sil/KSF | HZSM/SMM |
|---|---|---|---|---|---|---|
| Temp., °C. | 396 | 410/260 | 416/232 | 399/232 | 399/232 | 274/232 |
| Pressure, bar (g) | 41.5 | 41.5 | 41.5 | 69 | 69 | 69 |
| LHSV | 2 | 2/2 | 2/2 | 2/2 | 2/2 | 2/2 |
| Conversion % <371° C. | 22 | 25 | 26 | 24 | 23 | 22 |
| UV, Hr | 2 | 4 | 6 | 6 | 7 | 5 |

EXAMPLE 6

An experiment was performed to examine the effect of dewaxing and stabilizing Feed D using a silicalite material (in a composite with 35% Catapal alumina; silica:alumina mole ratio of 236:1) which had been steamed at 760° C. for 24 hours to reduce the hydrogen transfer activity of the catalyst, and a synthetic montmorillonite (Baroid Corp. SMM). The conditions included LHSV of 2 in both reaction zones; temperature of 232° C. in the second, montmorillonite stabilizing reaction zone; hydrogen rate of 12 MSCF/bbl. The temperature at the beginning of the dewaxing reaction zone, the overall pressures, and the product UV lives were as follows:

TABLE 3

| Time of Run (Hr) | First Zone Temp. (°C.) | Conversion (Vol. %) | UV Life (Hr) |
|---|---|---|---|
| Initial pressure, 41.5 bar (g) | | | |
| 16 | 382 | 27 | 7 |
| 88 | 404 | 14 | 6 |
| 161 | 432 | 26 | 6 |
| Pressure to 24 bar (g) | | | |
| 185 | 424 | 22 | 5 |
| Pressure to 69 bar (g) | | | |
| 233 | 396 | 24 | 6 |
| 304 | 396 | 19 | 6 |
| 354 | 398 | 21 | 7 |

These data illustrate that where hydrogen is present in the feedstock, higher pressures tend to give a more stable product than lower pressures.

I claim:

1. A lubricating oil dewaxing and stabilizing process, comprising:
   (a) catalytically dewaxing a hydrocracked hydrocarbonaceous feedstock by contacting said feedstock with a catalyst which comprises an intermediate pore size zeolite, said zeolite having a silica-to-alumina mole ratio of greater than about 200:1 and being in the hydrogen form, to produce a dewaxed effluent which contains olefins; and
   (b) stabilizing at least part of said dewaxed effluent by contacting said part with a heterogeneous acidic catalyst which is substantially free of hydrogenation activity.

2. A process according to claim 1 wherein said intermediate pore size zeolite is selected from ZSM-5, ZSM-11, silicalite, and mixtures thereof.

3. A process according to claim 1 wherein said heterogeneous acidic catalyst comprises an acidic clay.

4. A process according to claim 3 wherein said acidic clay is selected from montmorillonite, attapulgite and mixtures thereof.

5. A process according to claim 1 wherein said heterogeneous acidic catalyst comprises a crystalline aluminosilicate and the temperature of step (b) is less than the temperature of step (a).

6. A process according to claim 1 wherein said feedstock is substantially free of diluent gases and wherein the pressure in step (b) is less than about 35 bar.

7. A process according to claim 1 wherein said feedstock contains diluent gases and wherein the pressure in step (b) is greater than about 35 bar.

* * * * *